May 23, 1961 R. W. BEAUMONT 2,985,249
AUTOMATIC FEED CONTROL FOR ROCK DRILLS
Filed Dec. 4, 1958 2 Sheets-Sheet 2

INVENTOR
RICHARD W. BEAUMONT
BY
HIS ATTORNEY

United States Patent Office 2,985,249
Patented May 23, 1961

2,985,249

AUTOMATIC FEED CONTROL FOR ROCK DRILLS

Richard W. Beaumont, Hope Township, Warren County, N.J., assignor to Ingersoll-Rand Company, New York, N.Y., a corporation of New Jersey Filed Dec. 4, 1958, Ser. No. 778,220

5 Claims. (Cl. 175—27)

This invention relates to down-the-hole pneumatically operated percussive rock drills, so called because they are adapted to be inserted into the hole being drilled, and it has for its object to provide an automatic feeder for such drills.

Another object of the invention to to provide a novel and improved automatic feeder for drills of the above type actuated by the travel of the longitudinally movable spindle which rotates the percussive rock drill.

Still another object is to provide an automatic feeder including an air valve which is actuated by the travel of the spindle rotating the drill and controls the operation of a pneumatic feed motor by controlling its exhaust.

Various other objects and advantages will be apparent as the nature of the invention is more fully disclosed.

When drilling with a down-the-hole rock drill, it is very important to use the proper down pressure to avoid excessive bit wear or bit breakage. Also, if the drill is held back too much, the drill piston will strike a lighter blow and the penetration rate will be unnecessarily reduced.

In most situations the weight of the drill rod, plus the air line pressure against the feed cushion piston, provides the proper down pressure. To maintain this pressure, however, the operator must feed the rotary head down and keep it within the range of the longitudinally movable spindle which rotates the drill. This is difficult at night or at any time when the rotary head is near the top of the drill guide.

The automatic feeder of the present invention comprises a rotary type air valve which is mounted on the rotary head, i.e. the vertically movable carriage housing the drill rotating mechanism, and is actuated by the travel of the spindle which rotates the drill. This valve controls the flow of air from the exhaust of the feed motor which feeds said carriage toward the rock being drilled.

During the drilling operation, the spindle, which is slidably splined in a spindle driver, extends as the depth of the hole increases. As the spindle extends, the rotary feeder valve opens and allows the feed motor to exhaust to atmosphere through it. The feed motor receives a constant supply of air, hence it will operate and feed the rotary head down as long as said motor can exhaust through the feeder valve. However, as the rotary head is fed down and the spindle is compressed or slid longitudinally within the spindle driver in which it is slidably splined, a shoulder on the spindle closes the feeder valve and thus stops the feed motor by cutting off its exhaust passage through said valve.

The invention is described in connection with a preferred embodiment illustrated in the accompanying drawings, in which.

Figure 1:
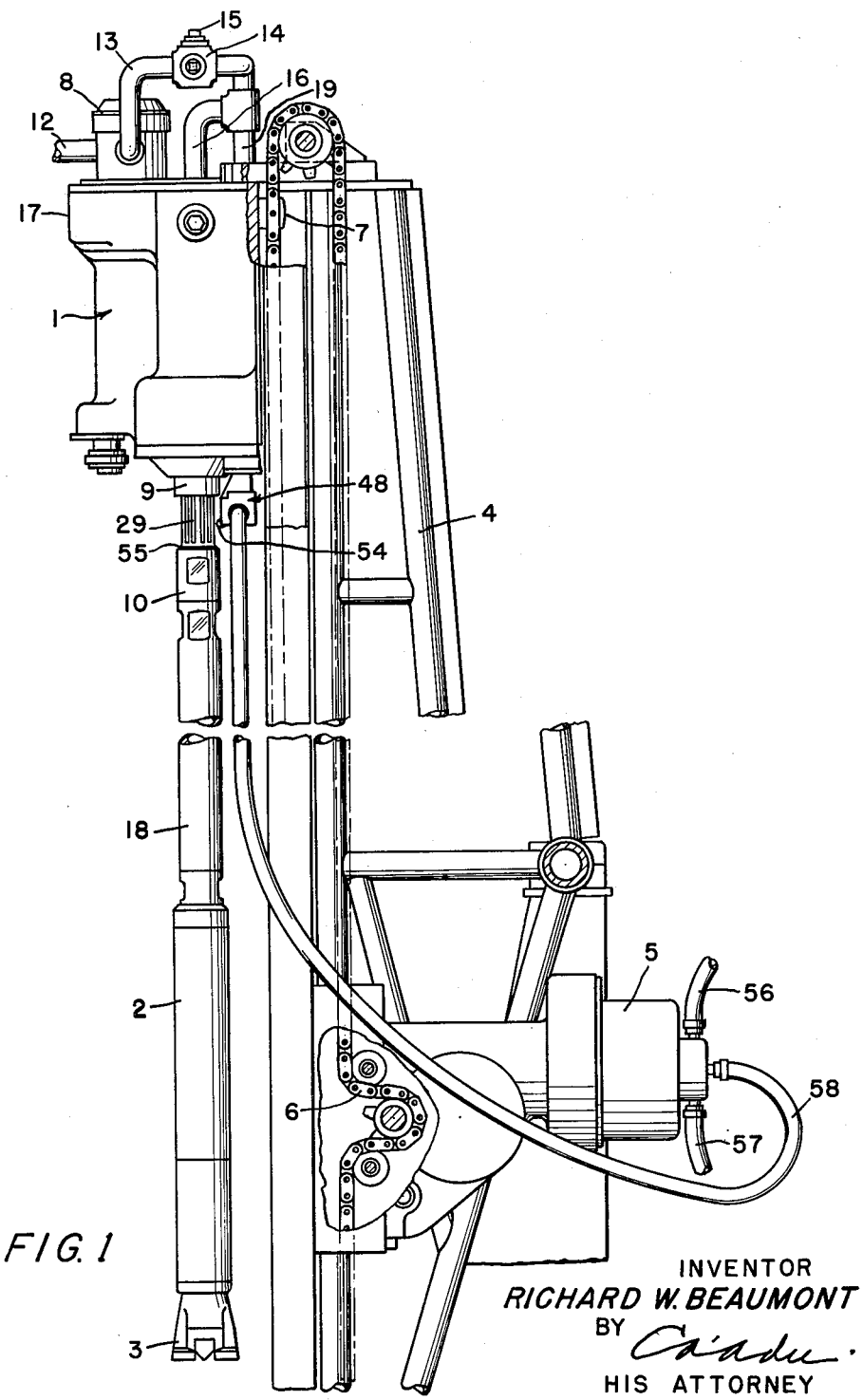
Fig. 1 is a side elevation, partly in section, showing a portion of a rock drilling machine having an automatic feed control embodying the invention.

The drawings show the invention as applied to a rock drill comprising a rotary head 1 containing the mechanism for rotating a down-the-hole percussive rock drill 2 having the usual drill bit 3.

The rotary head 1 carrying rock drill 2 is slidably mounted on a drilling rig 4 and is fed toward the rock being drilled by a feed motor 5 driving an endless chain mechanism 6 which is connected to the rotary head 1 at point 7.

The rotating mechanism of head 1 comprises a compressed gas motor 8 driving a rotatable spindle driver 9 connected to rotate a spindle 10. The spindle 10 is adapted to be connected to rotate the drill 2 and is movable longitudinally relative to the driver 9, as hereinafter more fully described. A portion of the spindle 10 is exposed to compressed gas tending to move the spindle in the direction toward the drill 2.

The motor 8 may be of the conventional vane type and for reasons of simplicity is shown as being unidirectional only, though in actual practice a conventional reversible type motor may be used requiring a reversing valve and additional piping. The motor 8 is operated by compressed gas conveyed thereto through a supply line 12 and exhausted through a line 13 and a three-way valve 14, either directly to the atmosphere through outlet 15 or through conduit 16 and casing 17 of rotary head 1 to the hollow spindle driver 9 whence it passes through the hollow spindle 10 and a hollow drill steel 18 to the drill being rotated.

The rotating mechanism in rotary head 1 is of a conventional type adapted to rotate either the down-the-hole percussive rock drill 2, or an out-of-the-hole percussive rock drill (not shown) or a rotary drill bit (not shown). In the case of the down-the-hole drill 2 (or an out-of-the-hole percussive drill) the compressed gas from motor 8 is exhausted directly to the atmosphere from valve 14 through outlet 15. At the same time compressed gas from a suitable supply source (not shown) is valved through a line 19 and conduit 16 to the spindle driver 9 and thence to the drill being rotated. Whenever a rotary drill bit is used, the gas exhausted by motor 8 is directed by the valve 14 through conduit 16 to the rotary drill bit to be used as cleansing fluid only. In such case the flow of compressed gas through the line 19 is cut off.

Figure 2:
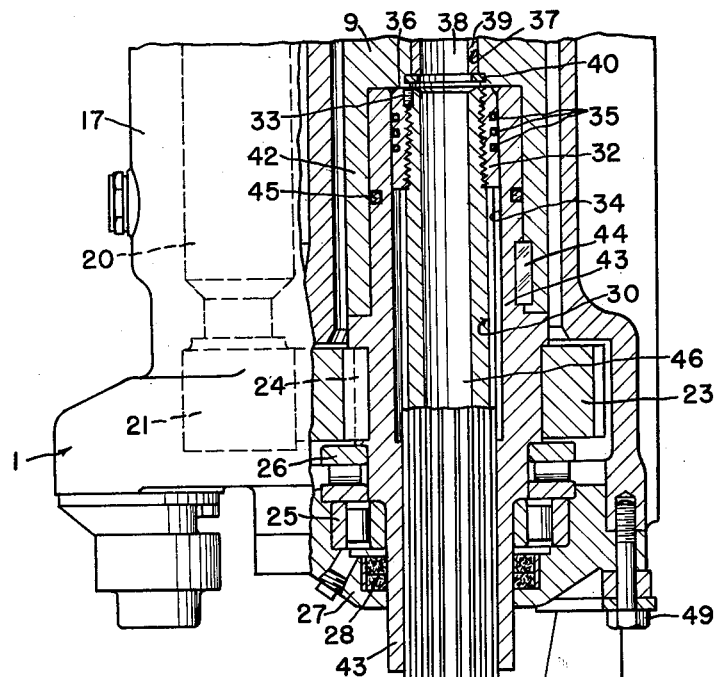
Fig. 2 is an enlarged vertical section through the rock drill rotating and feed control mechanisms of Fig. 1.

The motor 8 is mounted on casing 17 and drives the spindle driver 9 through suitable conventional gears which are housed in casing 17 but are omitted from the drawing in order to simplify the showing. Such gears rotate a jack shaft 20 which carries a pinion 21 engaging a gear 23 fixedly mounted on spindle driver 9 by a key 24. The rotatable spindle driver 9 is journaled in casing 17 by two sets of adjoining bearings adjacent the opposite ends of the driver, but only the bearings at the forward end of the driver are illustrated; these, as shown in Fig. 2, comprise a radial anti-friction bearing 25 and a thrust anti-friction bearing 26. The spindle driver 9 and its aforesaid sets of bearings 25 and 26 are held in place by a cover 27 which is bolted to the casing 17 and carries a seal 28 encircling the driver 9 to prevent leakage of lubricating oil.

The spindle 10 is connected to be rotated by the spindle driver 9 and is in axial alignment with and movable longitudinally relative to said driver. For this purpose, the intermediate portion of spindle 10 has a slidable interlocking connection with driver 9 and accordingly has a splined peripheral surface 29 slidably fitting a matching spined surface 30 in the forward portion of driver 9, as shown in Fig. 2. The rearward end portion of spindle 10 carries a sleeve 32 which is threaded thereon and is locked in place by a set screw 33 threaded in the screw joint therebetween. The sleeve 32 slidably fits a longitudinal bore 34 adjacent the splined surface 30 in spindle driver 9 and is provided with piston rings 35 bearing against said bore 34 to serve as a seal therebetween.

The rearward portion of spindle 10 acts as a piston tending to move the spindle in the direction toward the drill being rotated. For this purpose the rearward end of sleeve 32 defines an actuating surface 36 constantly exposed to the compressed gas conveyed thereto from the conduit 16 through a passage 37 in spindle driver 9 including the hole 38 of a tube 39 axially disposed in the rearward portion of spindle driver 9, and through the bore 34 forming an enlarged portion of said passage. The tube 39, fitted in the driver 9 to rotate therewith, is locked in place by a snap ring 40. The rearward portion of tube 39 is not shown but slidingly fits a conventional seal to preclude leakage of the compressed gas from conduit 16 into casing 17.

It will be noted that the spindle driver 9 is of composite construction to permit the assembly of the tube 39 therein, and the sleeve 32 on spindle 10. To this end the driver 9 consists of a rearward section 42 in which is fitted in axial alignment therewith a forward section 43 containing the bore 34. A key 44 interlockingly engaging the forward and rearward sections 43 and 42, respectively, provides a positive connection between the sections. The forward section 43 carries an O-ring 45 which bears against the rearward section 42 to preclude leakage of compressed gas through the joint therebetween.

The spindle 10 contains a longitudinal passage 46 extending from end to end thereof which is in constant communication with the spindle driver passage 37 for conveying compressed gas therefrom to the drill being rotated. In accordance with the usual practice, well understood in the art, the forward end of the spindle passage 46 terminates in a thread (not shown) adapted to receive either one of the aforementioned drills or the drill steel 18 to form therewith a driving connection.

In operating the device thus far described as a down-the-hole rock drill, the spindle 10 together with the steel 18 and drill 2 is rotated by motor 8 through the above-mentioned gearing and the spindle driver 9 while the rotary head 1 is simultaneously fed by the feed motor 5 through chain mechanism 6 toward the rock being drilled. At the same time, compressed gas is conducted either from the line 13 or the line 19 through the conduit 16, passage 37, and spindle passage 46 to the drill being rotated. The gas in passage 37 exerts a pressure against the actuating surface 36 tending to move the spindle 10 in the direction toward the drill and constantly holding the drill bit 3 against the rock. With the bit in this position the rotary head 1 is normally located on the drilling rig 4 by the feed motor 5 so that the spindle 10 assumes a medial position of its stroke in the spindle driver 9.

Since the spindle 10 and the steel 18 and connected drill 2 are free to move back and forth longitudinally relative to the driver 9, the operator can ordinarily take note of any changes in the feed rate of the drill. Thus, if the drill bit 3 encounters a void or soft spot in the rock formation causing the spindle 10 to move forwardly relative to the spindle driver 9, and this is observed by the operator, he can regulate the speed of feed motor 5 to restore the spindle to its medial position. Thus under ordinary circumstances it is possible for the operator to feed the rotary head 1 down and keep it within the range of the spindle spline. However, it is difficult to do this at night, or at any time when the rotary head 1 is near the top of the drill rig.

The automatic feeder of the present invention comprises a rotary type air valve 48 which is secured to the rotary head 1 by bolts 49 and is actuated by the travel of the splined spindle 10. The valve 48 has a stationary valve cylinder 50 containing a port 51 and a surrounding rotatable cylindrical member 52 containing a port 53 adapted to register with said port 51. The rotatable valve member 52 has an integral actuating tongue 54 which projects outwardly adjacent the splined surface 29 of spindle 10 above the enlarged shoulder 55 of spindle 10 just below said splined surface.

Referring particularly to Fig. 1, it will be noted that the feed motor 5 driving the endless chain mechanism 6 has two inlet lines 56 and 57, and an exhaust line 58. Compressed gas entering inlet line 56 drives the endless chain mechanism 6 in a direction to raise the rotary head 1, while compressed gas entering inlet line 57 drives the chain mechanism in a direction to lower said head.

Figure 3:
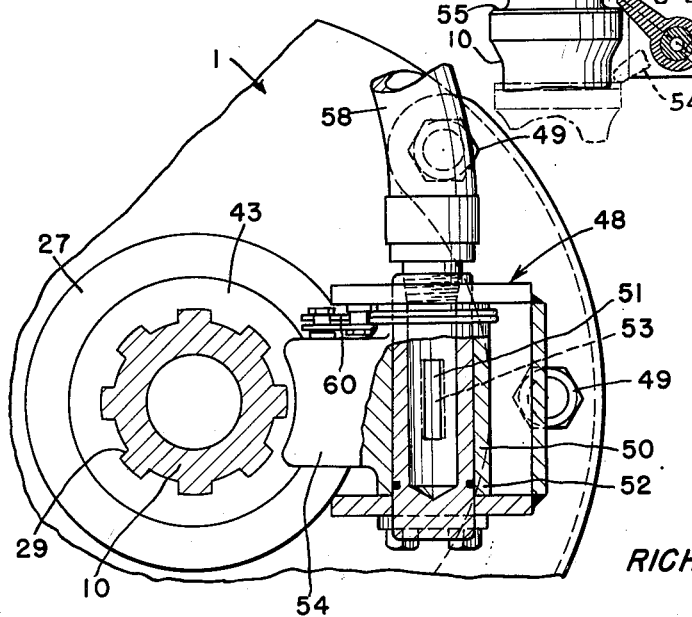
Fig. 3 is an enlarged transverse section taken on line 3—3 of Fig. 2.

The exhaust line 58 from feed motor 5 is connected to the stationary cylinder 50 of air valve 48, hence when the port 53 of rotatable valve member 52 registers with the port 51 of said stationary valve cylinder 50 the feed motor 5 exhausts through exhaust line 58 and ports 51 and 53 of air valve 48 to atmosphere. The valve 48 is shown in the open position in Figs. 2 and 3.

In operating the rock drill, the drill bit starts drilling a hole in the usual manner, at which time the air valve 48 is in the closed position indicated by the dot and dash lines in Fig. 2. As the depth of the hole increases the splined spindle 10 is extended, usually to the extent of eight inches. As the spindle 10 feeds out the valve 48 opens and allows the feed motor 5 to exhaust to atmosphere through valve ports 51 and 53, as described above. Since the feed motor 5 receives a constant supply of compressed air through supply line 57, it will operate and feed the rotary head 1 down as long as said feed motor 5 can exhaust through the feeder valve 48. As the rotary head continues to be fed down, the spindle 10 is compressed within the spindle driver 9 in which it is slidably splined, whereupon the shoulder 55 of spindle 10, immediately below the splined surface 29 thereof, raises the actuating tongue 54 of valve 48 thus rotating valve member 52 and closing the valve. This stops the feed motor 5 by cutting off its exhaust passage. The valve 48 is held in open position by a wire spring 60 and normally rides in the partly open position with its tongue 54 against the shoulder 55 of spindle 10. The mounting of valve 48, as shown in Fig. 2, is such that, even if spindle 10 is completely compressed for any reason, the valve will not be damaged.

Although a specific embodiment has been shown and described herein for purposes of illustration, it will be evident to those skilled in the art that the invention is capable of various modifications and adaptations within the scope of the appended claims.

The invention claimed is:

1. Automatic feeding apparatus for down-the-hole rock drills comprising, a drilling rig, a drill, a rotary head including a rotating mechanism movable longitudinally on said rig for moving said drill longitudinally, a spindle driver carried by said head and rotated by said mechanism, a longitudinally movable drill-rotating spindle slidably mounted in said driver and connected to rotate therewith, means for limiting the longitudinal sliding movement of said spindle inwardly and outwardly of said driver, means for feeding said rotary head longitudinally on said rig, and means controlled by the longitudinal movement of said spindle for controlling the operation of said feeding means.

2. Automatic feeding apparatus for down-the-hole rock drills comprising a rig, a rotary head including a rotating mechanism movable longitudinally on said rig, a spindle driver carried by said head and rotated by said mechanism, a longitudinally movable drill-rotating spindle slidably mounted in said driver and connected to rotate therewith, said driver having means for conducting compressed gas therethrough and said spindle having a portion exposed to such gas tending to move said spindle outwardly of said driver, means for limiting the longitudinal sliding movement of said spindle inwardly and outwardly of said driver, means including a motor for feeding said rotary head longitudinally on said rig, and means responsive to the longitudinal movement of said spindle out of and into said driver for starting and stopping said motor.

3. Automatic feeding apparatus for down-the-hole rock drills comprising a rig, a rotary head including a rotating mechanism movable up and down on said rig, a spindle driver carried by said head and rotated by said mechanism, a longitudinally movable drill-rotating spindle slidably mounted in said driver and connected to rotate therewith, said driver having means for conducting compressed gas therethrough and said spindle having a portion exposed to such gas tending to move said spindle outwardly of said driver, means on said spindle limiting its longitudinal sliding movement inwardly and outwardly of said driver, means including a pneumatic feed motor having air intake and exhaust lines for feeding said rotary head up and down on said rig, an air valve mounted on said rotary head and connected to said exhaust line for venting the latter to atmosphere in the open position of said valve, and means on said valve engageable with said spindle and actuated thereby to open and close said valve.

4. Automatic feeding apparatus for down-the-hole rock drills comprising a rig, a rotary head including a rotating mechanism movable up and down on said rig, an internally splined tubular spindle driver carried by said head and rotated by said mechanism, a longitudinally movable externally splined drill-rotating spindle slidably mounted in said driver and rotatable therewith through the interengagement of said internal and external splines, said driver having means for conducting compressed gas therethrough and said spindle having a portion exposed to such gas tending to move said spindle outwardly of said driver, means on said spindle limiting its longitudinal sliding movement inwardly and outwardly of said driver, means including a pneumatic feed motor having air intake and exhaust lines for feeding said rotary head up and down on said rig, a rotary air valve mounted on said rotary head and connected to said exhaust line and adapted to connect the latter to atmosphere in the open position of said valve, and an actuating tongue on said valve engageable with said spindle and movable thereby to up and down positions to close and open said valve.

5. Automatic feeding apparatus for down-the-hole rock drills comprising a rig, a rotary head including a rotating mechanism movable up and down on said rig, an internally splined tubular spindle driver carried by said head and rotated by said mechanism, a longitudinally movable externally splined drill-rotating spindle slidably mounted in said driver and rotatable therewith through the interengagement of said internal and external splines, said driver having means for conducting compressed gas therethrough and said spindle having a portion exposed to such gas tending to move said spindle outwardly of said driver, means on said spindle limiting its longitudinal sliding movement inwardly and outwardly of said driver, means including a pneumatic feed motor having air intake and exhaust lines for feeding said rotary head up and down on said rig, a rotary air valve mounted on said rotary head and having a stationary inner valve cylinder connected to said exhaust line and a cooperating rotary outer valve cylinder having an actuating tongue engageable with said spindle and movable to up and down limiting positions by the relative up and down movement of said spindle with respect to said rotary head, and cooperating ports in said valve cylinders registering in downward positions of said tongue to exhaust said feed motor to atmosphere and non-registering in the upper limiting position of said tongue to cut off the exhaust from said feed motor and stop the latter.

References Cited in the file of this patent

UNITED STATES PATENTS

| 1,475,989 | Easterday | Dec. 4, 1923 |
| 2,796,767 | Carpenter | June 25, 1957 |
| 2,879,033 | Edwards et al. | Mar. 24, 1959 |
| 2,895,715 | Stenuick | July 21, 1959 |